US008625434B2

(12) United States Patent
Morse et al.

(10) Patent No.: US 8,625,434 B2
(45) Date of Patent: Jan. 7, 2014

(54) IP BASED VOICE COMMUNICATION ENABLED INSPECTION SYSTEM

(75) Inventors: Bradford Morse, Syracuse, NY (US); Thomas D. Britton, Syracuse, NY (US); James Jonathon Delmonico, Baldwinsville, NY (US)

(73) Assignee: GE Inspection Technologies LP, Schenectady, NY (US)

( * ) Notice: Subject to any disclaimer, the term of this patent is extended or adjusted under 35 U.S.C. 154(b) by 1885 days.

(21) Appl. No.: 11/648,190

(22) Filed: Dec. 29, 2006

(65) Prior Publication Data

US 2008/0157994 A1 Jul. 3, 2008

(51) Int. Cl.
*H04L 12/66* (2006.01)

(52) U.S. Cl.
USPC ........... 370/241; 370/252; 370/356; 600/118; 348/14.01

(58) Field of Classification Search
USPC .......................... 370/241, 250, 252, 355, 356
See application file for complete search history.

(56) References Cited

U.S. PATENT DOCUMENTS

| | | | |
|---|---|---|---|
| 2,524,651 | A | 10/1950 | Cooley |
| 2,949,071 | A | 8/1960 | Foures |
| 3,561,432 | A | 2/1971 | Yamaki et al. |
| 4,042,823 | A | 8/1977 | Decker et al. |
| 4,078,864 | A | 3/1978 | Howell |
| 4,139,822 | A | 2/1979 | Urich et al. |
| 4,253,447 | A | 3/1981 | Moore et al. |
| 4,261,344 | A | 4/1981 | Moore et al. |
| 4,298,312 | A | 11/1981 | MacKenzie et al. |
| RE31,289 | E | 6/1983 | Moore et al. |
| RE31,290 | E | 6/1983 | Moore et al. |
| 4,557,598 | A | 12/1985 | Ono et al. |
| 4,573,450 | A | 3/1986 | Arakawa |
| 4,576,147 | A | 3/1986 | Hashiguchi |
| 4,588,294 | A | 5/1986 | Siegmund |
| 4,621,284 | A | 11/1986 | Nishioka et al. |
| 4,621,618 | A | 11/1986 | Omagari |
| 4,651,201 | A | 3/1987 | Schoolman |
| 4,656,508 | A | 4/1987 | Yokota |
| 4,659,195 | A | 4/1987 | D'Amelio et al. |
| 4,667,656 | A | 5/1987 | Yabe |
| 4,700,693 | A | 10/1987 | Lia et al. |
| 4,727,859 | A | 3/1988 | Lia |
| 4,733,937 | A | 3/1988 | Lia et al. |

(Continued)

FOREIGN PATENT DOCUMENTS

WO WO-2005020577 A1 3/2005

OTHER PUBLICATIONS

U.S. Appl. No. 60/786,829, filed Mar. 27, 2006, Lambdin et al.
U.S. Appl. No. 11/645,073, filed Dec. 22, 2006, Morse et al.

*Primary Examiner* — Brian O'Connor
(74) *Attorney, Agent, or Firm* — Global Patent Operation; Mark A. Conklin

(57) ABSTRACT

An inspection apparatus can be provided in a system with a workstation computer. In one embodiment, the inspection apparatus can include a user interface enabling the inspection apparatus to initiate, responsively to an action by an inspector, an IP based voice communication connection with an external computer of the system. In one embodiment, the inspection apparatus and the workstation computer can be in communication with a central server that can receive data collected by said the inspection apparatus and can receive data requests from the workstation computer.

32 Claims, 6 Drawing Sheets

(56) References Cited

U.S. PATENT DOCUMENTS

| | | | | |
|---|---|---|---|---|
| 4,735,501 | A | 4/1988 | Ginsburgh et al. | |
| 4,787,369 | A | 11/1988 | Allred, III et al. | |
| 4,790,294 | A | 12/1988 | Allred, III et al. | |
| 4,794,912 | A | 1/1989 | Lia | |
| 4,796,607 | A | 1/1989 | Allred, III et al. | |
| 4,827,909 | A | 5/1989 | Kato et al. | |
| 4,862,253 | A | 8/1989 | English et al. | |
| 4,862,873 | A | 9/1989 | Yajima et al. | |
| 4,887,154 | A | 12/1989 | Wawro et al. | |
| 4,909,600 | A | 3/1990 | Ciarlei et al. | |
| 4,913,369 | A | 4/1990 | Lia et al. | |
| 4,926,257 | A | 5/1990 | Miyazaki | |
| 4,941,454 | A | 7/1990 | Wood et al. | |
| 4,941,456 | A | 7/1990 | Wood et al. | |
| 4,962,751 | A | 10/1990 | Krauter | |
| 4,979,498 | A | 12/1990 | Oneda et al. | |
| 4,980,763 | A | 12/1990 | Lia | |
| 4,989,581 | A | 2/1991 | Tamburrino et al. | |
| 4,998,182 | A | 3/1991 | Krauter et al. | |
| 5,010,876 | A | 4/1991 | Henley et al. | |
| 5,014,515 | A | 5/1991 | Krauter | |
| 5,014,600 | A | 5/1991 | Krauter et al. | |
| 5,018,436 | A | 5/1991 | Evangelista et al. | |
| 5,018,506 | A | 5/1991 | Danna et al. | |
| 5,019,121 | A | 5/1991 | Krauter | |
| 5,045,935 | A | 9/1991 | Kikuchi | |
| 5,047,848 | A | 9/1991 | Krauter | |
| 5,052,803 | A | 10/1991 | Krauter | |
| 5,061,995 | A | 10/1991 | Lia et al. | |
| 5,066,122 | A | 11/1991 | Krauter | |
| 5,070,401 | A | 12/1991 | Salvati et al. | |
| 5,114,636 | A | 5/1992 | Evangelista et al. | |
| 5,140,319 | A | 8/1992 | Riordan | |
| 5,140,975 | A | 8/1992 | Krauter | |
| 5,191,879 | A | 3/1993 | Krauter | |
| 5,202,758 | A | 4/1993 | Tamburrino | |
| 5,203,319 | A | 4/1993 | Danna et al. | |
| 5,222,477 | A | 6/1993 | Lia | |
| 5,275,152 | A | 1/1994 | Krauter et al. | |
| 5,278,642 | A | 1/1994 | Danna et al. | |
| 5,314,070 | A | 5/1994 | Ciarlei | |
| 5,323,899 | A | 6/1994 | Strom et al. | |
| 5,335,662 | A | 8/1994 | Kimura et al. | |
| 5,345,339 | A | 9/1994 | Knieriem et al. | |
| 5,347,989 | A | 9/1994 | Monroe et al. | |
| 5,365,331 | A | 11/1994 | Tamburrino et al. | |
| 5,373,317 | A * | 12/1994 | Salvati et al. | 348/65 |
| D358,471 | S | 5/1995 | Cope et al. | |
| 5,435,296 | A | 7/1995 | Vivenzio et al. | |
| 5,633,675 | A | 5/1997 | Danna et al. | |
| 5,701,155 | A | 12/1997 | Wood et al. | |
| 5,734,418 | A | 3/1998 | Danna | |
| 5,751,341 | A | 5/1998 | Chaleki et al. | |
| 5,754,313 | A | 5/1998 | Pelchy et al. | |
| 5,857,963 | A | 1/1999 | Pelchy et al. | |
| 5,895,350 | A | 4/1999 | Hori | |
| 5,911,036 | A | 6/1999 | Wright et al. | |
| 5,941,818 | A | 8/1999 | Hori et al. | |
| 5,966,168 | A | 10/1999 | Miyazaki | |
| 5,989,185 | A | 11/1999 | Miyazaki | |
| 6,066,090 | A | 5/2000 | Yoon | |
| 6,083,152 | A | 7/2000 | Strong | |
| 6,097,848 | A | 8/2000 | Salvati | |
| 6,106,457 | A * | 8/2000 | Perkins et al. | 600/175 |
| 6,119,179 | A | 9/2000 | Whitridge et al. | |
| 6,139,490 | A | 10/2000 | Breidenthal et al. | |
| 6,221,007 | B1 | 4/2001 | Green | |
| 6,432,046 | B1 | 8/2002 | Yarush et al. | |
| 6,468,201 | B1 | 10/2002 | Burdick | |
| 6,471,642 | B1 | 10/2002 | Igarashi | |
| 6,483,535 | B1 | 11/2002 | Tamburrino et al. | |
| 6,487,479 | B1 | 11/2002 | Nelson | |
| 6,494,739 | B1 | 12/2002 | Vivenzio et al. | |
| 6,538,732 | B1 | 3/2003 | Drost et al. | |
| D473,306 | S | 4/2003 | Motoki et al. | |
| 6,590,470 | B1 | 7/2003 | Burdick | |
| 6,614,872 | B2 | 9/2003 | Bueno et al. | |
| 6,668,272 | B1 | 12/2003 | Keller et al. | |
| 6,697,794 | B1 | 2/2004 | Milby | |
| 6,763,175 | B1 | 7/2004 | Trottier et al. | |
| 6,772,098 | B1 | 8/2004 | Stark et al. | |
| 6,830,545 | B2 | 12/2004 | Bendall | |
| 6,950,829 | B2 | 9/2005 | Schlabach et al. | |
| 6,953,432 | B2 | 10/2005 | Schiefer | |
| 6,982,763 | B2 | 1/2006 | Perry | |
| 7,134,993 | B2 | 11/2006 | Lia et al. | |
| 7,212,227 | B2 * | 5/2007 | Amling et al. | 348/72 |
| 7,252,633 | B2 * | 8/2007 | Obata et al. | 600/118 |
| 7,382,741 | B2 * | 6/2008 | Rao | 370/255 |
| 7,430,179 | B2 * | 9/2008 | Towns-von Stauber et al. | 370/252 |
| 7,512,906 | B1 * | 3/2009 | Baier et al. | 715/866 |
| 7,539,724 | B1 * | 5/2009 | Callaghan | 709/205 |
| 7,610,225 | B2 * | 10/2009 | O'Neill | 705/30 |
| 7,831,628 | B1 * | 11/2010 | Silva et al. | 707/802 |
| 2002/0007289 | A1 * | 1/2002 | Malin et al. | 705/4 |
| 2002/0128790 | A1 | 9/2002 | Woodmansee | |
| 2002/0172498 | A1 | 11/2002 | Esenyan et al. | |
| 2002/0191082 | A1 * | 12/2002 | Fujino et al. | 348/211.14 |
| 2003/0004397 | A1 | 1/2003 | Kameya et al. | |
| 2003/0097042 | A1 | 5/2003 | Eino | |
| 2003/0105565 | A1 | 6/2003 | Loda et al. | |
| 2003/0128400 | A1 | 7/2003 | Watai et al. | |
| 2004/0064323 | A1 | 4/2004 | Kemper et al. | |
| 2004/0183900 | A1 | 9/2004 | Karpen et al. | |
| 2004/0193016 | A1 | 9/2004 | Root et al. | |
| 2004/0205556 | A1 * | 10/2004 | Abramovitch | 715/513 |
| 2004/0215413 | A1 | 10/2004 | Weldum et al. | |
| 2004/0225185 | A1 | 11/2004 | Obata et al. | |
| 2005/0015480 | A1 | 1/2005 | Foran | |
| 2005/0041097 | A1 | 2/2005 | Bernstein et al. | |
| 2005/0050707 | A1 * | 3/2005 | Scott et al. | 29/426.5 |
| 2005/0129108 | A1 * | 6/2005 | Bendall et al. | 375/240.01 |
| 2005/0162643 | A1 | 7/2005 | Karpen | |
| 2005/0187739 | A1 | 8/2005 | Baust et al. | |
| 2005/0219263 | A1 | 10/2005 | Thompson et al. | |
| 2005/0281520 | A1 | 12/2005 | Kehoskie et al. | |
| 2006/0015919 | A1 | 1/2006 | Karppinen et al. | |
| 2006/0050983 | A1 | 3/2006 | Bendall et al. | |
| 2006/0072903 | A1 | 4/2006 | Weldum et al. | |
| 2006/0087402 | A1 | 4/2006 | Manning et al. | |
| 2006/0200001 | A1 | 9/2006 | Keller | |

* cited by examiner

| Equipment # | Inspection Apparatus | Time Stamp | File | Inspector |
|---|---|---|---|---|
| ... | ... | ... | ... | ... |
| 123 AAA | 111 | 6/27/06 8:30 | Path/Name | Martin |
| ... | ... | ... | ... | ... |
| 123 AAA | 100 | 12/31/06 9:00 | Path/Name | Johnson |
| 123 AAA | 100 | 12/31/06 9:02 | Path/Name | Johnson |
| 564 BBB | 101 | 12/31/06 9:04 | Path/Name | Blake |
| 123 AAA | 100 | 12/31/06 9:06 | Path/Name | Johnson |
| 123 AAB | 110 | 12/31/06 9:08 | Path/Name | Smith |

| Inspector | VOIP # |
|---|---|
| Johnson | ~ |
| Jones | ~ |
| Martin | ~ |
| Smith | ~ |

IP BASED VOICE COMMUNICATION ENABLED INSPECTION SYSTEM

FIELD OF THE INVENTION

The invention relates generally to inspection systems and particularly to a voice enabled inspection system.

BACKGROUND OF THE PRIOR ART

Various proposals have been made for providing an inspection system comprising multiple computers. In U.S. Pat. No. 6,772,098, assigned to the assignee of the present invention, a method is provided for managing inspection requirements using a network based system. The system includes a server system coupled to a centralized database and at least one client system. The method includes receiving information relating to a plurality of components of a specific plant and storing the information into a centralized database. The method further includes cross-referencing the information received, updating the centralized database based on the information received, and providing information in response to an inquiry.

DETAILED DESCRIPTION OF THE INVENTION

There is described herein an inspection system for inspecting articles which, in one embodiment, can comprise industrial equipment articles. The inspection system where provided by a visual inspection system can comprise a visual inspection apparatus and one or more computers external to the visual inspection apparatus. The inspection apparatus can comprise, e.g., a visual inspection apparatus, an eddy current inspection apparatus, or an ultrasonic inspection apparatus. A visual inspection apparatus of the system can have an elongated inspection tube and a two dimensional image sensor. A visual inspection apparatus can also have a voice coder/decoder for converting analog voice signals into digital form and for converting digital voice signals into analog form. An acoustic input device generating analog voice signals can be coupled to the coder/decoder and an acoustic output device receiving analog voice signals can be coupled to the coder/decoder. A visual inspection apparatus can be configured (adapted) to enable IP based voice communications between said visual inspection apparatus and computers in IP network communication with said visual inspection apparatus. The system can include more than one inspection apparatus. In one embodiment, the visual inspection apparatus can be configured to include a user interface enabling the inspection apparatus to initiate, responsively to an action by an inspector an IP based voice communication, e.g., a Voice Over Internet Protocol (VOIP) voice communications connection with an external computer of the system. The term "adapted" herein has the same meaning as the term "configured". A technical effect is improved information dissemination in an inspection system.

Figure 1:
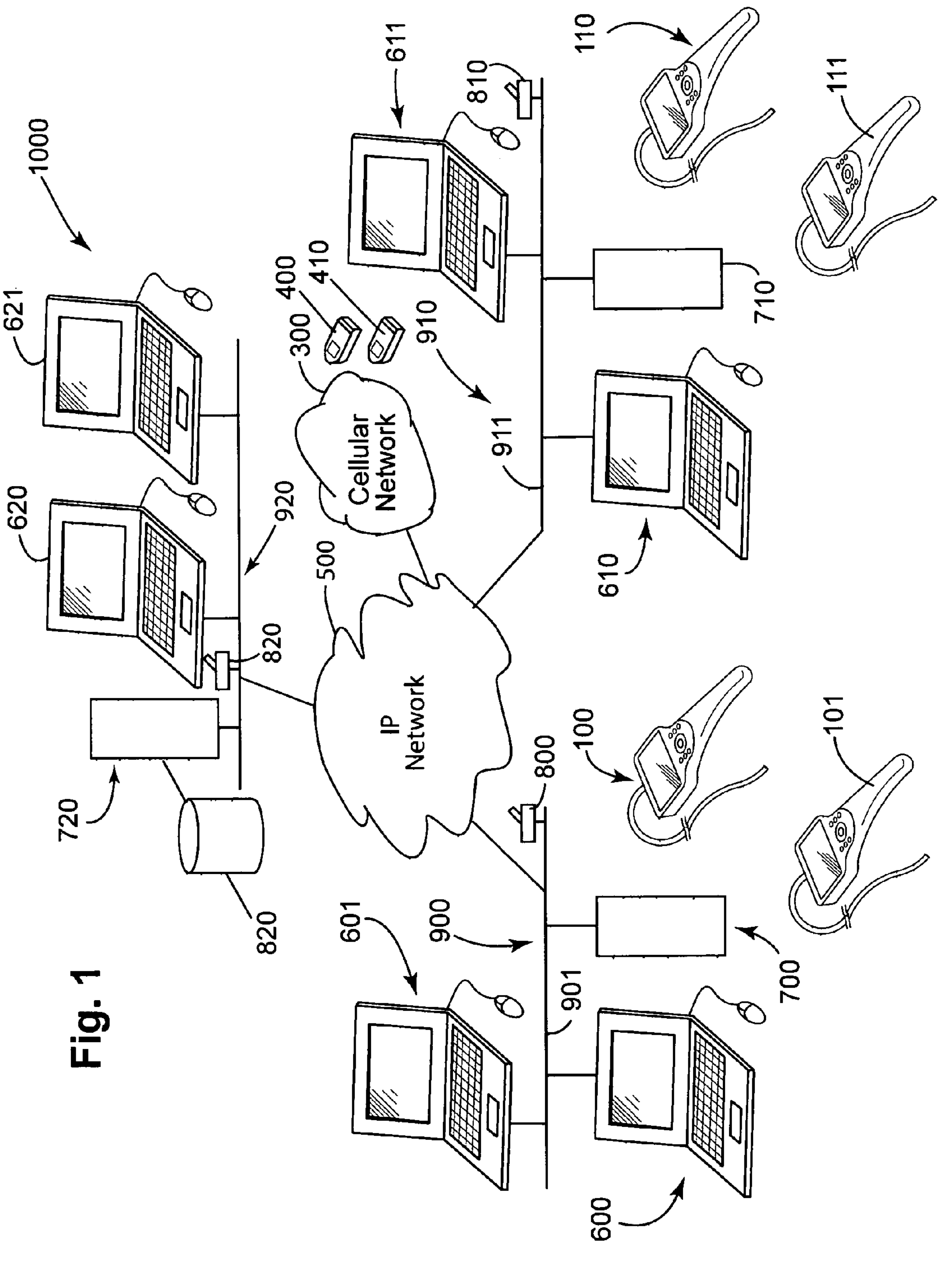
FIG. 1 is a network view of a voice enabled system.

An exemplary system 1000 is shown in FIG. 1. System 1000 can include a plurality of computers. For example, system 1000 can include computers in the form of inspection apparatus 100, inspection apparatus 101, workstation computer 600, workstation computer 601, server 700, inspection apparatus 110, inspection apparatus 111, workstation computer 610, workstation computer 611, server 710, workstation computer 620, workstation computer 621 and server 720, and computers in the form of mobile telephones 400, 410. Computers 100, 101, 600, 601 can be part of LAN 900 disposed in a common local facility. Computers 110, 111, 610, 611 can be part of LAN 910 disposed in a common local facility and computers 620, 621, 720 can be part of LAN 920 disposed in a common local facility. Each of LANs 900, 910, 920 can be disposed apart from one another, e.g., miles, to tens of miles, to hundreds of miles. LANs 900, 910, 920 in one embodiment, can incorporate wireless access points 800, 810, 820 respectively. In another aspect LANs 900, 910, 920 can be can be in communication via IP network 500 which supports Internet Protocol (IP) communications. Mobile telephone computers 400, 410 can be in communication with the remainder of the computers of system 1000 by way of WWAN cellular network 300 in communication with IP network. Cellular network 300 can be e.g., a GSM/GPRS cellular network in a CDMA cellular network. Cellular network 300 can be configured to support IP communications. In another aspect, one or more computers of system 1000 can be configured as a Dynamic Host Configuration Protocol (DHCP) server that assigns IP addresses and which maintains a record correlating assigned IP addresses with device identifiers (e.g., lower layer addresses) corresponding to the assigned IP addresses. All of the computers of system 1000 can incorporate an IP protocol suite and can be configured to support a variety of transport layer protocols such TCP and UDP, and a variety of application layer protocols such at FTP and HTTP.

The inspection system contemplates that there may be persons in spaced apart locations forming an inspection apparatus interested in the results of an inspection being performed. There are described aspects of a system in which IP based voice communication can be carried out between an inspection apparatus and a computer external to the inspection apparatus.

Figure 2:
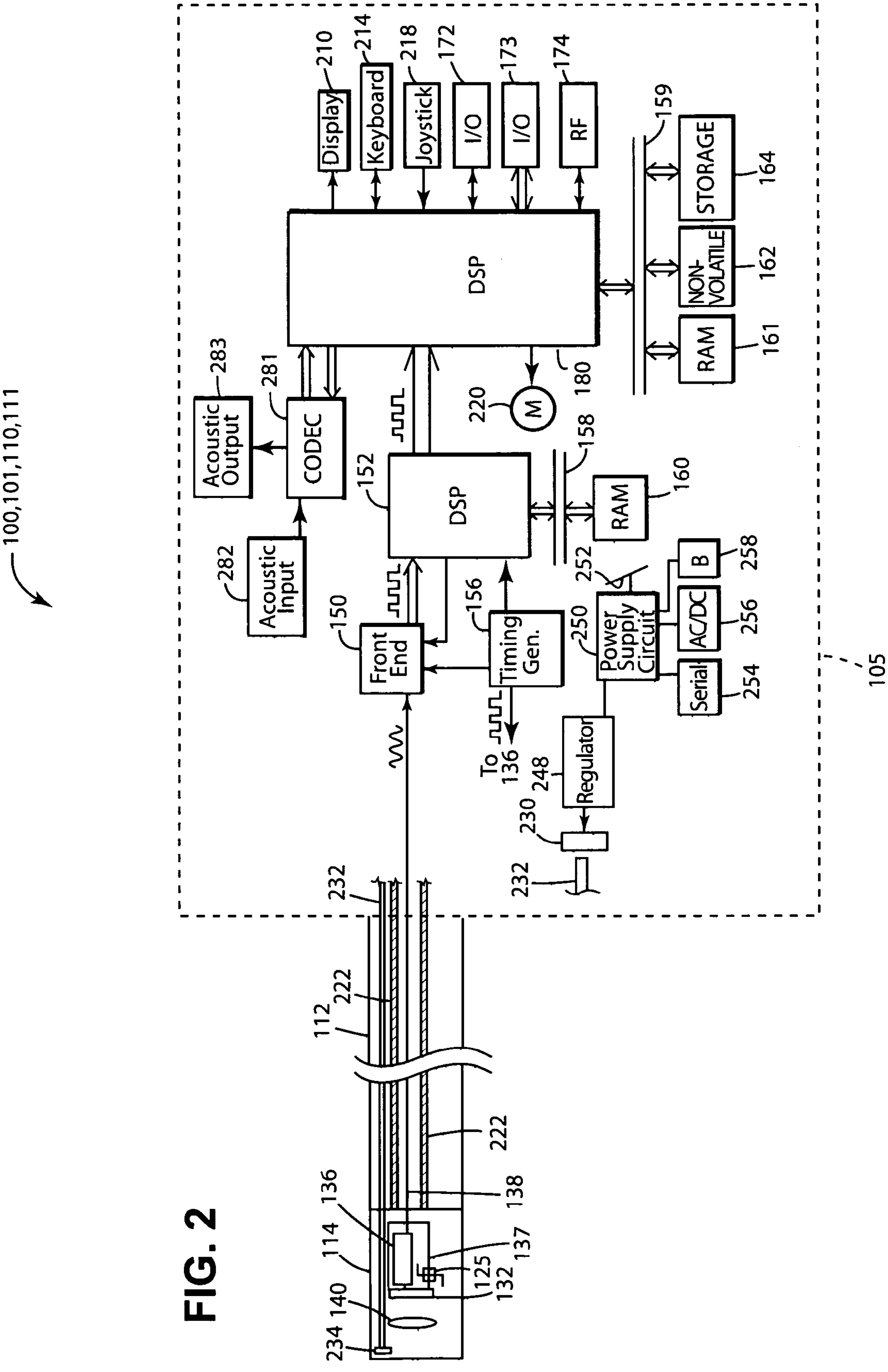
FIG. 2 is a block diagram of an exemplary inspection apparatus.

Referring now to aspects of inspection apparatuses 100, 101, 110, 111 each inspection apparatus 100, 101, 110, 111, where provided by a visual inspection apparatus, as shown in FIG. 2 can include an elongated inspection tube 112 and a head assembly 114 disposed at a distal end of the elongated inspection tube. Head assembly 114 can include solid state image sensor 132 and imaging lens 140. Imaging lens 140 can focus an image onto an active surface of solid state image sensor 132. Imaging lens 140 can comprise e.g., a lens singlet or a lens having multiple components, e.g., a lens doublet, a lens triplet. Solid state image sensor 132 can be, e.g., a CCD or CMOS image sensor. Solid state image sensor 132 can include a plurality of pixels formed in a plurality of rows and columns where solid state image sensor 132 including pixels formed in a plurality of rows and columns, solid state image sensor 132 can be regarded as a two-dimensional image sensor. Solid state image sensor 132 can be provided on an integrated circuit. Image sensor 132 can generate image signals in the form of analog voltages representative of light incident on each pixel of the image sensor. Referring to further aspects of head assembly 114, image sensor 132 can be controlled so that image signals are clocked out from image sensor 132. Analog voltages representative of light incident on the various pixels of image sensor 132 can be propagated through signal conditioning circuit 136 along a cable, e.g., a coaxial cable disposed within elongated inspection tube 112. Head assembly 114 can include signal conditioning circuit 136 which conditions analog image signals for input to cable 138 and receives timing and control signals for control of image sensor 132. In one embodiment, image sensor 132 and signal conditioning circuit 136 can be mounted on a common circuit board 137.

In the embodiment of FIG. 2, head assembly 114 of apparatus 100 at a distal end of inspection tube 112 comprises image sensor 132. An image sensor 132 of inspection apparatuses 100, 101, 110, 111, in one alternative embodiment, can be located at a position spaced apart from head assembly 114, and disposed at a position rearward of a proximal end of inspection tube 112. For example, image sensor 132 can be disposed in base assembly 105 interfaced to elongated inspection tube 112. Base assembly 105 can comprise one or more housings and can include the components included within dashed-in border 105 of FIG. 2. An imaging system fiber optic bundle (not shown), in an alternative embodiment, can be disposed in elongated inspection tube 112, and can terminate in head assembly 114. The apparatus can be configured so that such a fiber optic bundle relays image forming light rays from head assembly 114 to the spaced apart image sensor spaced apart from head assembly 114.

Various circuits disposed at a position spaced apart from head assembly 114 can receive and process image signals generated by image sensor 132. In one embodiment, various circuits receiving and processing image signals generated by image sensor 132 can be disposed in base assembly 105 interfaced to elongated inspection tube 112 as shown in FIG. 2. In the exemplary embodiment of FIG. 2, analog front end circuit 150 can include an analog gain circuit, an analog-to-digital converter, and a correlated double sampler and can receive analog image signals, digitize such signals and transmit digitized image signals to digital signal processor 152 (DSP). DSP 152, in the embodiment shown, can be configured to perform such processing tasks as color matrix processing, gamma processing, and can process digital image signals into a standardized video format, wherein video signals are expressed in a standardized data format. By way of example, video signals output by DSP 152 can be in a BT656 video format and data carried in the video signal can have a 422YCRCB data format. DSP 152 can be in communication with a random access memory 160 through system bus 158. Referring to further aspects of an electrical circuit for an inspection apparatus 100, 101, 110, 111, apparatus 100, 101, 110, 111 can include timing generator circuit 156 which can send timing and control signals to signal conditioning circuit 136 for input to image sensor 132 as well as to analog front end circuit 150 and DSP 152. As indicated by communication line labeled "to 136," timing generator circuit 156 can send control signals such as exposure timing signals, and frame rate timing signals to signal conditioning circuit 136 for input to image sensor 132. In one embodiment, analog circuit front end 150, DSP 152, and timing generator circuit 156 can be provided on separate integrated circuits (ICs). In one embodiment, analog front end circuit 150, DSP 152, and timing generator circuit 156 are provided as part of commercially available chips, e.g., an SS2 DSP chipset of the type available from SONY. While an analog to digital converter for converting analog image signals into digital form is described herein as being incorporated into front end circuit 150, such an analog to digital converter can be incorporated into an image sensor integrated circuit which commonly carries pixels of an image sensor and an analog to digital converter for digitizing analog image signals.

Referring to further aspects of apparatus 100, 101, 110, 111 apparatus 100, 101, 110, 111 can include DSP 180. DSP 180 can receive the formatted video output from DSP 152 for further processing. DSP 180 can be configured to perform a variety of processing tasks such as frame averaging, scaling, zoom, overlaying, merging, image capture, flipping, image enhancement, and distortion correction. In one embodiment, DSP 180 can be provided by a TMS32ODM642 Video/Imaging Fixed-Point Digital Signal Processor of the type available from TEXAS INSTRUMENTS. DSP 180 can be in communication with a volatile memory 161, e.g., a RAM, a non-volatile memory 162, and storage memory device 164. Non-volatile memory 162 can be provided e.g., by a flash memory device, an EEPROM memory device, or an EPROM memory device. Software for operating an inspection apparatus 100, 101, 110, 111 can be retained in non-volatile memory 162 when apparatus 100 is not operating and such software can be loaded into RAM 161 when apparatus 100, 101, 110, 111 is driven into an operating state. Apparatus 100, 101, 110, 111 can include other types of storage memory. For example, a USB "thumb drive" can be plugged into serial I/O interface 172. A CompactFlash memory card can be plugged into parallel I/O interface 173. A memory of apparatus 100, 101, 110, 111 can be regarded as including memory 161, 162, and 164, other storage memory, as well as internal buffer memories of DSP 152 and 180. Storage memory device 164 can be, e.g., a hard drive or removable disk. RAM 161, non-volatile memory 162, and storage device 164 can be in communication with DSP 180 via system bus 159. While DSP 152 and DSP 180 are shown as being provided on separate integrated circuits, the circuits of DSP 152 and DSP 180 could be provided on a single integrated circuit. Also, the functionalities provided by DSP 152 and DSP 180 could be provided by one or more general purpose microprocessor ICs.

Apparatus 100, 101, 110, 111 can be configured so that image signals are read out of image sensor 132 row by row until a frame of image signals including image signals corresponding to multiple rows of pixels of image sensor 132 have been read out. A frame of analog image signals can be converted into a frame of digital signals. Specifically, analog image signals read out from image sensor 132 can be converted into digital form by front end circuit 150. Front end circuit 150, in turn, can feed digitized frame image signals into DSP 152. DSP 152 can format the image signals into a specific format before feeding the digitized image signals for further processing to DSP 180. Digitized frame image signals can be referred to as frame image data.

Referring to further circuit components of the block diagram of FIG. 2, apparatus 100, 101, 110, 111 can further include display 210, keyboard 214, and joystick 218. Keyboard 214 enables apparatus 100, 101, 110, 111 to initiate various control signals for the control of apparatus 100, 101, 110, 111 responsively to an action by an inspector. Display 210 enables display of live video streaming images and other images to an inspector. For example, apparatus 100, 101, 110, 111 can be controlled to switch from a live streaming video mode in which a live streaming video is being displayed on display 210 to a mode in which a still image is displayed on display 210. Apparatus 100, 101, 110, 111 can be configured so that apparatus 100, 101, 110, 111 can generate frame output control signals responsively to an action by an inspector. Apparatus 100, 101, 110, 111 can be configured so that an inspector can cause initiation of a frame output control signal by actuating a designated button of keyboard 214. Frame output control signals can include, e.g., a freeze frame control signal, and a save frame control signal. Apparatus 100, 101, 110, 111 can be configured so that when a freeze frame control signal is initiated, apparatus 100, 101, 110, 111 can repeatedly output a frame retained on a frame buffer of RAM 161 to display 210. Apparatus 100, 101, 110, 111 can be configured so that when a "save frame" control signal is initiated, apparatus 100, 101, 110, 111 can output a frame retained in a frame buffer or RAM 161 to an addressable memory location, e.g., a memory location to non-volatile memory 162 and/or storage device 164. During performance of an inspection procedure, an inspector may initiate (cause initiation of) a save frame control signal several times to save numerous frames relating to a work subject (e.g., an equipment article) being subject to an inspection. A user interface of apparatus 100, 101, 110, 111 can include keyboard 214, joystick 218, and display 210.

Apparatus 100, 101, 110, 111 can also be configured to encode image data into predetermined file formats. For example, apparatus 100, 101, 110, 111 can encode a saved frame of image data into a predetermined image file format (e.g., JPG, PDT). Apparatus 100, 101, 110, 111 can encode a set of frames into a video file format, e.g., MPEG.

In a further aspect, DSP 180 can be coupled to a serial I/O interface 172, e.g., an ETHERNET or USB interface and a parallel data interface 173, e.g., a CompactFlash interface or PCMCIA interface. DSP 180 can also be coupled to a wireless data communication interface 174, e.g., an IEEE 802.11 interface. For wireless communication of data packets to an access point 800, 810, and/or a cellular network 300, wireless data communication interface 174 in one embodiment can incorporate both a shorter range wireless transceiver (e.g., IEEE 802.11) and a wide range cellular transceiver (e.g., GSM, CDMA). Apparatus 100, 101, 110, 111 can be configured to send frames of image data saved in a memory thereof to an external computer and can further be configured to be responsive to requests for frames of image data saved in a memory device of apparatus 100, 101, 110, 111. Apparatus 100, 101, 110, 111 can incorporate an Internet protocol suite. With incorporation of an Internet protocol suite, apparatus 100, 101, 110, 111 incorporates several transport layer protocols including TCP and UDP and a variety of different application layer protocols including HTTP and FTP as indicated in FIG. 1. Each apparatus 100, 101, 110, 111, can simultaneously be in wireline communication with its respective backbone 901, 911 and in wireless communication with one or more of a wireless access point and cellular network 300.

Referring to further aspects of apparatus 100, 101, 110, 111, apparatus 100, 101, 110, 111 can include joystick 218 for controlling a positioning of head assembly 114. In one embodiment, articulation cables 222 can be incorporated in elongated inspection tube 112 to enable movement of head assembly 114 into a desired position so that a field of view of apparatus 100, 101, 110, 111 can be changed. Joystick 218 can be in communication with DSP 180. Apparatus 100, 101, 110, 111 can be configured so that control signals for controlling movement (articulation) of head assembly 114 are initiated by manipulating joystick 218. Apparatus 100, 101, 110, 111 can be configured so that when joystick 218 is moved, DSP 180 receives a control signal from joystick 218 and sends corresponding motor control signals to articulation motor 220 to produce a desired movement of head assembly 114. Apparatus 100, 101, 110, 111 can be configured so that joystick 218 operates as a pointer controller where display 210 has displayed thereon a graphical user interface (GUI) pointer.

In another aspect, inspection apparatus 100, 101, 110, 111 can include a light source 230, (e.g., an arc lamp or a bank of one or more LEDs), which, like circuits 150, 152, 156, and 180 can be disposed at a position spaced apart from head assembly 114. Apparatus 100, 101, 110, 111 can also include an illumination fiber optic bundle 232 receiving light emitted from light source 230. Fiber optic bundle 232 can be disposed in elongated inspection tube 112 so that fiber optic bundle 232 can relay light emitted from light source 230 through inspection tube 112 and to head assembly 114. A distal end of fiber optic bundle 232 can be interfaced to diffuser 234 for diffusing illumination light. Fiber optic bundle 232 and diffuser 234 can be arranged to project light over an area approximately corresponding to a field of view of image sensor 132. In a further aspect, light source 230 can be powered by a regulator 248 coupled to a power supply circuit 250. Power supply circuit 250 can be arranged to power circuit board 252 receiving various integrated circuits of apparatus 100, 101, 110, 111 as well buses 158, 159. Power supply circuit 250 can be interfaced to various alternative power sources e.g., serial I/O power source 254, AC/DC transformer source 256 and rechargeable battery 258.

Referring to further aspects of inspection apparatus 100, 101, 110, 111, inspection apparatus 100, 101, 110, 111 can include audio signal coder/decoder (CODEC) 281. CODEC 281 can receive analog audio signals from an acoustic input device 282, e.g., a microphone, can convert such analog audio signals into digital form and can feed digitized audio signals to DSP 180. CODEC 281 can further receive digitized audio signals from DSP 180, can convert such digital signals into analog form, and can feed an output analog signal to an acoustic output device 283, e.g., a speaker.

In another aspect, each inspection apparatus 100, 101, 110, 111 can be configured to convert digital audio signals into a format suitable for transmission over an IP network. In one example, DSP 180 can be configured to encode digital audio signals received from CODEC 281 into VOIP data packets. In another example, DSP 180 can be configured to encode digital audio signals received from CODEC 281 into a streaming audiovisual format such as MPEG4. DSP 180 can also be configured to receive data packets carrying voice data, e.g., VOIP data packets, MPEG 4 data packets, and process data of such packets into a form suitable for sending to CODEC 281, which can, in turn, feed analog voice signals to acoustic output device 283. Each apparatus 100, 101, 110, 111 can also be configured to initiate an IP based voice communication connection with an external computer of system 1000 as indicated in FIG. 1. When an IP based voice communication connection has been established, data packets containing voice data, e.g., VOIP packets, MPEG4 packets, can be streamed over the connection.

Figure 3:
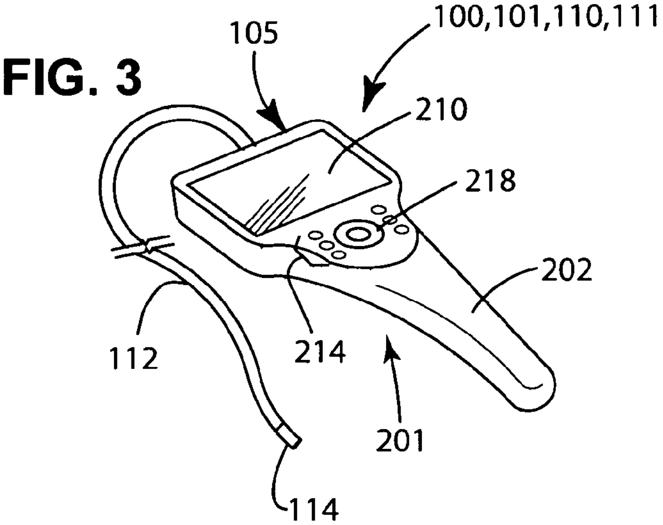
FIG. 3 is an exemplary physical form view of an inspection apparatus.
Figure 4:
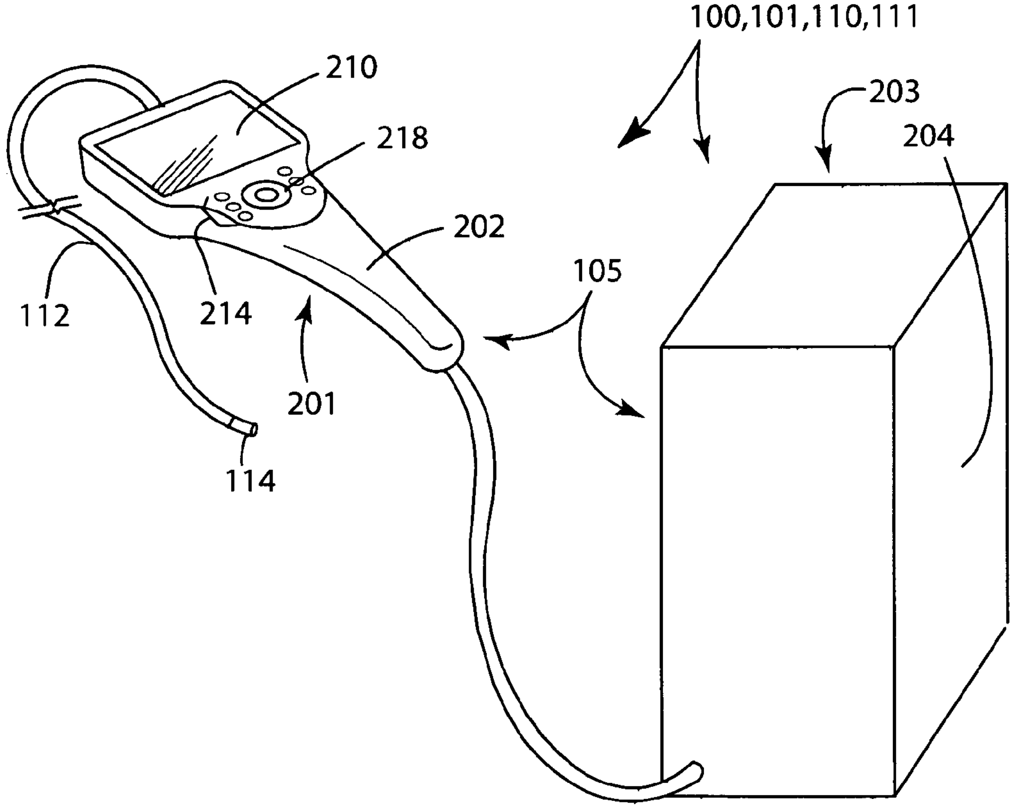
FIG. 4 is another exemplary physical form view of an inspection apparatus.

Exemplary physical form views of the apparatus 100, 101, 110, 111 shown in an electrical block view of FIG. 2 are shown in FIGS. 3 and 4. In the view of FIG. 3, apparatus 100, 101, 110, 111 includes elongated inspection tube 112, head assembly 114, and handset 201 incorporating housing 202, display 210, keyboard 214, and joystick 218. All of the components within the dash-in border 105 of FIG. 2 can be incorporated into housing 202. In the embodiment of FIG. 4, apparatus 100, 101, 110, 111 can include a base unit 203 having a housing 204 incorporating a subset of the circuits shown in FIG. 2. For example, housing 204 can incorporate circuits 162, 164, 180, and 172. Handset 201 of FIGS. 3 and 4 can be a portable hand held handset sized and shaped to be held in a human hand. Skilled artisans will recognize that modifications to the circuit of FIGS. 2 may be required if the circuits therein are distributed between a plurality of housings. For example, serial-deserializer circuits and twisted pair couplings as are explained in U.S. Provisional Patent Application No. 60/786,829 filed Mar. 27, 2006, incorporated herein by reference can be employed to transmit required video and control signals over distances of several feet at a high data rate. Additional circuits might be employed for communicating user initiated control signals generated at handset 201 to base unit 203. Additional circuits might also be employed for communicating image signals from base unit 203 to handset 201.

In one embodiment, apparatus 100, 101, 110, 111 can have a base assembly 105, incorporating the components designated within dashed-in border 105 of FIG. 2. The components of base assembly 105 can be spread out into one or more housings. In the embodiment of FIG. 3, a single housing base assembly is provided. In the embodiment of FIG. 4, base assembly 105 comprises handset 201 and base unit 203. In another embodiment (not shown), base assembly 105 can include handset 201 and base unit 203. However, rather than being interfaced to handset 201, elongated inspection tube 112 can be interfaced to base unit 203.

Figure 5:
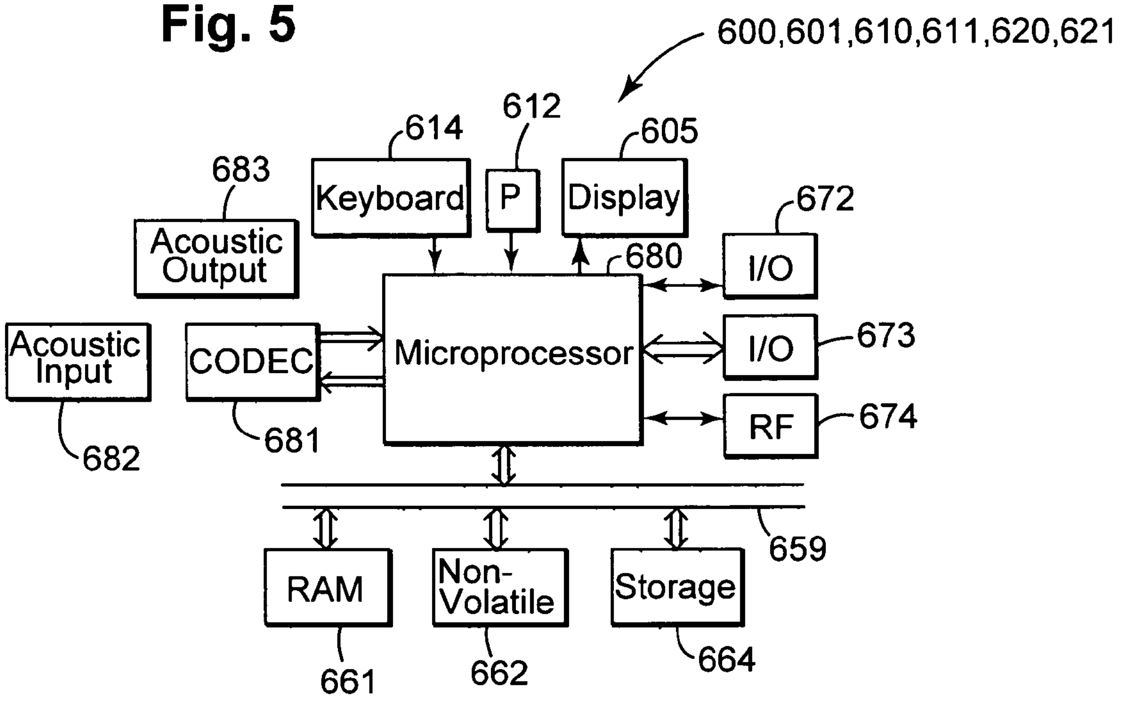
FIG. 5 is a block diagram of an exemplary workstation computer.

Referring to FIG. 5, an exemplary block diagram of a workstation computer 600, 601, 610, 611, 620, 621 is shown and described. Workstation computers 600, 601, 610, 611, 620, 621 can include a microprocessor 680 interfaced to a system memory via system bus 659. The system memory can include a RAM 661 and a non-volatile memory 662. A memory of each workstation computer 600, 601, 610, 611, 620, 621 can also include a storage device 664 coupled to microprocessor 680 via system bus 659. Workstation computers 600, 601, 610, 611, 620, 621 can also include various input/output interfaces such as a serial input/output interface 672, a parallel input/output interface 673, and an RF interface 674. Each workstation computer 600, 601, 610, 611, 620, 621 can also include user interface comprising a keyboard 614, display 605 and a pointer controller 612. Further referring to workstation computers 600, 601, 610, 611, 620, 621, workstation computers 600, 601, 610, 611, 620, 621 can include audio signal coder/decoder (CODEC) 681. CODEC 681 can receive analog audio signals from an acoustic input device 682, e.g., a microphone, can convert such analog audio signals into digital form, and can feed digitized audio signals to microprocessor 680. CODEC 681 can further receive digitized audio signals from microprocessor 680, can convert such digital signal into analog form, and can feed an output analog signal to an acoustic output device 683, e.g., a speaker.

In another aspect, each workstation computer 600, 601, 610, 611, 620, 621 can be configured to convert digitized audio signals into a format suitable for transmission over an IP network. In one example, microprocessor 680 can be configured to encode digital audio signals received from CODEC 681 into VOIP data packets. In another example, microprocessor 680 can be configured to encode digital audio signals received from CODEC 681 into a streaming audio/visual format such as MPEG4. Microprocessor 680 can also be configured to receive data packets carrying voice data, e.g., VOIP data packets, MPEG 4 data packets, and process data of such packets into a form suitable for sending to CODEC 681 which, in turn, can convert digital audio signals into analog form for sending to acoustic output device 683. Each workstation computer 600, 601, 610, 611, 620, 621 can also be configured to initiate IP based voice communication connections with an external computer of system 1000. Workstation computers 600, 601, 610, 611, 620, 621 shown as being provided by portable laptop computers, can also be provided, e.g., by mobile telephones, desktop computers.

Respecting, mobile telephone computers 400, 410, computer 400, 410 can be provisioned in the manner of workstation computers 600, 601, 610, 611, 620, 621, except that with circuitry restricted to a smaller size, packaging requirements and battery operation typically will incorporate less powerful processors than the workstation computers, and reduced functioned operating system. RF interface 674 in the case a mobile telephone computer will typically be provided by at least a cellular transceiver.

Figure 6:
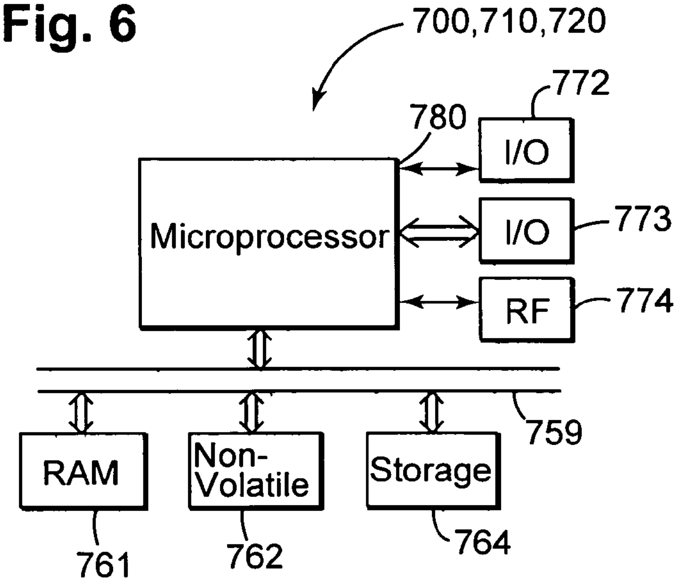
FIG. 6 is an exemplary block diagram of a server computer.

Referring to FIG. 6, there is shown an exemplary block diagram of server 700, 710, 720. Server 700, 710, 720 can include microprocessor 780 coupled to a system memory over a system bus 759. A system memory can comprise RAM 761 and a non-volatile memory 762. A storage memory device 764 can also be in communication with microprocessor 780 via system bus 759. Server 700, 710, 720 can include serial I/O interface 772, parallel I/O interface 773, and RF interface 774 coupled to microprocessor 780.

Figure 7:
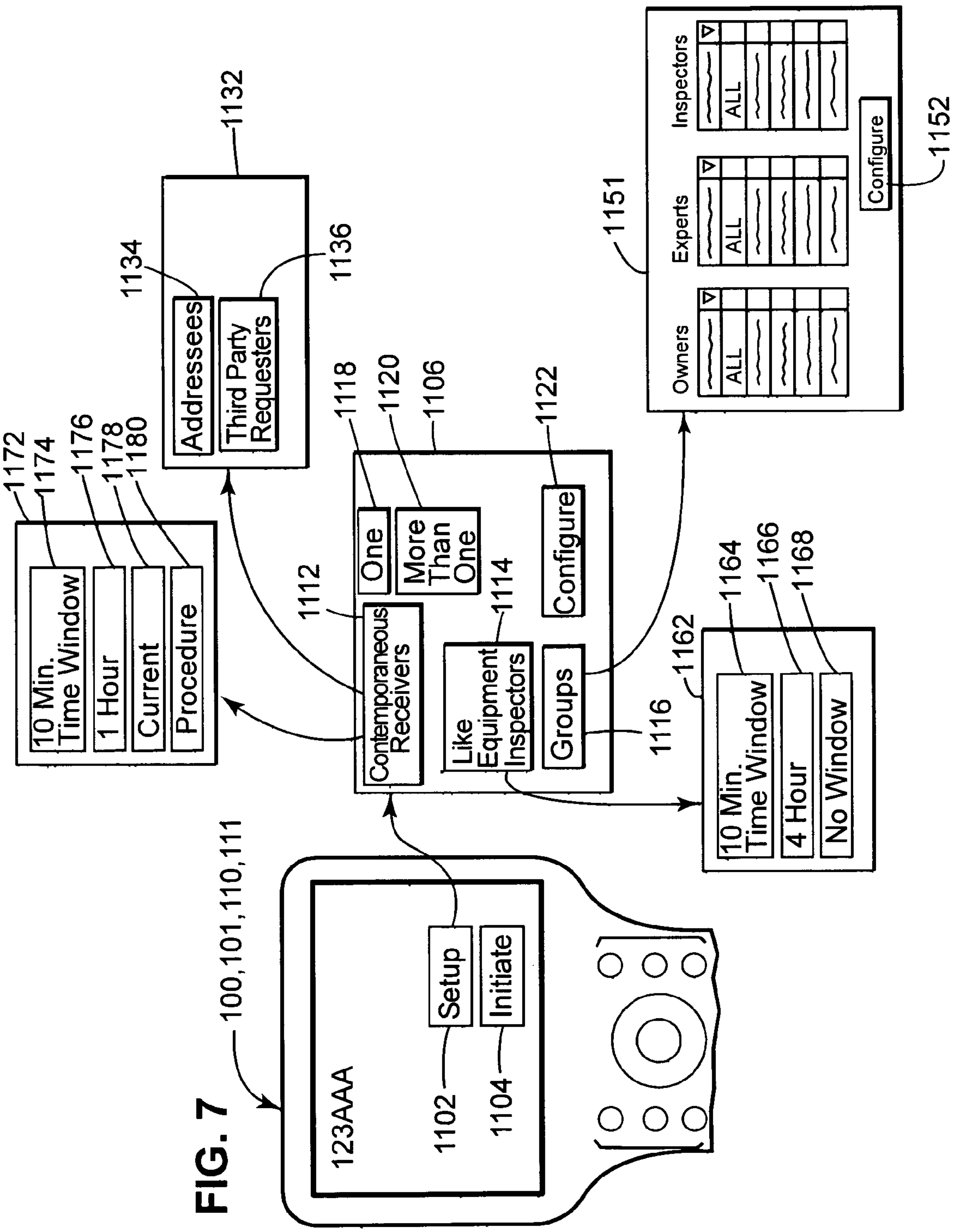
FIG. 7 illustrates an exemplary user interface of an inspection apparatus.

With reference to FIG. 7, there is shown an exemplary user interface for selecting and causing initiation of (initiating) an IP based voice communication connections between an inspection apparatus and an external computer. In one aspect, visual inspection apparatus 100, 101, 110, 111 is configured to include a user interface enabling an inspector to cause initiation of (to initiate) an IP based voice communication connection with a computer of said system 1000 external to said visual inspection apparatus.

Referring to FIG. 7, a user interface of apparatus 100, 101, 110, 111 can include a graphical user interface including a setup button 1102 and an initiate button 1104. In the exemplary example, apparatus 100, 101, 110, 111 can be configured so that setup selections can be activated and deactivated by actuation of the buttons (e.g., clicking on). In the exemplary example, a button can be highlighted (e.g., displayed in a different color) to designate an active state. It is expected that during the course of operating an inspection apparatus it may be desirable for an inspector to initiate a voice communication connection with one or more computers of system 1000 as shown in FIG. 1. For example, an inspector may note a problem with an inspection article being subject to inspection and may wish to orally report the problem to persons at spaced apart locations receiving the data being collected during a current inspection. An inspector may also wish to report the problem to one or more owners, experts (supervisors) and other inspectors (peers). Referring to FIG. 7, actuating setup button 1102 can bring up a configuration window 1106 for designating information which can be used by apparatus 100 in initiating an IP based communication connection. Responsively to an actuation of initiate button 1104 by an inspector after a setup has been completed, inspection apparatus 100, 101, 110, 111 can initiate the IP based voice communication connection utilizing information designed during setup.

Referring to window 1106, window 1106 can include contemporaneous receiver button 1112 like equipment inspections button 1114; group button 1116, one button 1118, more than one button 1120, and configure button 1122. When one button 1118 is selected, apparatus 100, 101, 110, 111 is set up to address an IP based voice communication connection to a single address. When more than one button 1120 is selected, apparatus 100, 101, 110, 111 is set up to address an IP based voice communication connection to more than one IP address. By actuating configure button 1122 or configure button 1152, an inspector can indicate that all setup parameters have been finalized.

Certain examples described here forward will discuss the case where the particular inspection apparatus 100 collects data and addresses data packets to a central server 720. However, it will be understood that any other apparatus of system 1000 can collect and send data, and that data collected by an inspection apparatus can be addressed to a computer other than server 720, for example, data collected by an inspection apparatus can be sent by addressing data packets to one or more workstation computers.

Still referring to the graphical user interface of FIG. 7, by actuating contemporaneous receivers button 1112, an inspector can configure an apparatus, e.g., apparatus 100 so that when a next IP based voice communication connection is initiated responsively to an actuation of initiate button 1104, data packets containing voice data are addressed to computers of system 1000 contemporaneously receiving data from inspection apparatus 100. By a computer contemporaneously receiving data from an apparatus 100 it is meant that the computer is currently receiving data from the computer (e.g., as in a stream) or has received data (e.g., an image file, video file including an audiovisual file or other data collected by the apparatus) within a predetermined time window (e.g., 10 minutes, 1 hour) or has received data collected by apparatus during the course of completing a current inspection having a predetermined number of inspection requirements. Computers contemporaneously receiving data can be regarded as contemporaneous receivers. Contemporaneous receivers can comprise two varieties: addressees and third party requesters. A contemporaneous receiver computer can be regarded as an addressee if an apparatus, e.g., 100 is currently addressing data packets to the computer or has addressed a data packet to the computer within a predetermined time window or has addressed data packet to the computer during the course of completing a current inspection having a predetermined number of inspection requirements. In some instances an apparatus, e.g., 100 may be sending collected inspection data such as media files to a central computer, e.g., server 720, and one or more workstation computers of system, e.g., computer 620 may request data from the server 720. In such instances, apparatus 100 will not be addressing data packets collected during an inspection to the computer 620 directly but rather will address data packets to server 720. Computer 620, in the described example, can be regarded as a third party requester (receiver) computer since it receives data from apparatus 100 not from apparatus 100 directly but by requesting the data from a central computer 720 to which the data packets are addressed and that has been designated as a central repository for the data. With reference to FIG. 7, apparatus 100 can be configured so that when contemporaneous receivers button 1112 is actuated, window 1132 is displayed to allow an inspector to select by actuation of button 1134 and button 1136 whether a next IP based voice communication connection, when initiated, will be addressed to addressees, third party requesters, or both.

For informing inspection apparatus 100 of a list addresses for third party requests, a central server 720, in the example described, can incorporate an application for monitoring data requests from computers of system 1000. When central server 720 receives a request from a computer, e.g., computer 620 for data collected from a particular inspection apparatus, e.g., apparatus 100, in the example described, central server 720, in accordance with the monitoring application, can send a communication to the particular inspection apparatus 100 informing the inspection apparatus 100 of the data request. In such manner inspection apparatus 100 can maintain a list of contemporaneous receiver computers, even where such computers are third party requesters. Inspection apparatus 100 in turn can selectively address external computers utilizing such list when commanded to initiate an IP based voice communication connection. Contemporaneous receivers can be regarded as computers which are currently receiving data collected and transmitted by apparatus 100 (e.g., as in streaming video data packets) or which have recently received data from apparatus 100, e.g., within a designated time window or which has received data collected by apparatus 100 in the course of completing an inspection having a predetermined number of requirements, at least one of which has not yet completed. System 1000 can be configured so that such a designated time window is user adjustable. For example, the time window can be adjusted between various time windows of short duration of less than, e.g., 1 day (5 hours, 1 hour, 10 minutes, etc.).

By actuating contemporaneous receivers button 1112, an inspector can set up apparatus 100 so that an IP based voice communication connection will be addressed to a computer which is contemporaneously receiving data from apparatus 100. In such manner, the voice communication connection, e.g., which may alert as to a problem and which will allow an inspector to verbally explain a problem will be addressed to a computer or computers which can be expected to have users who are viewing or which have recently viewed data collected by the inspection apparatus. It has been explained that contemporaneous receiver computers of system 1000 as shown in FIG. 1 can include computers that are currently receiving streaming data (e.g., MPEG4 streaming video data) being colleted by apparatus 100. Accordingly, it is seen that system 1000 can be configured so that when initiate button 1104 is actuated by an inspector, apparatus 100 can initiate an IP based voice communication connection (e.g., a VOIP connection) while a computer is currently receiving streaming video data being collected by apparatus 100. Accordingly, apparatus 100 can be configured to simultaneously support a streaming audio VOIP communication and a streaming video (e.g., MPEG4) communication over a common connection.

Still referring to FIG. 7, by actuating button 1114 an inspector can designate that the inspector would like a next IP based voice communication connection to be addressed to a computer being used by an inspector who is inspecting a like equipment article to the one currently being inspected by the inspector of apparatus 100. A like equipment article can be identical equipment article or an equipment article of the same type. When button 1114 is selected, an address for sending of voice data packets may be determined by way of examining data collected by several inspection apparatus 100, 101, 110, 111.

As has been indicated, system 1000 as shown in FIG. 1 can be set up so that each apparatus 100, 101, 110, 111 sends data to a central server 720 retaining a central database 820. Each media file (e.g., image file, video file including audio visual file) collected by apparatus 100 can have associated metadata (data about the data). The metadata can be written to an empty field of the media file. Alternatively, the metadata can also be written to a separate file such as a document (e.g., XML file) that apparatus 100 creates for each media file collected. A document file for each media file can comprise a reference to the media file and metadata associated with the media file. The reference can include document text that indicates the media file or the reference can be provided by commonly naming the document file and its reference media file. Inspection metadata and guided inspection procedures are described further in U.S. patent application No. (Not Yet Assigned), filed Dec. 22, 2006 entitled, "Inspection Apparatus For Inspecting Articles" which is incorporated herein by reference in its entirety and U.S. Patent Application No. 60/786, 829 filed Mar. 27, 2006 also incorporated herein by reference in its entirety. Metadata associated with each media file can comprise alternative forms, e.g., equipment number (equipment #), job number (job #), inspector, apparatus number (apparatus #), and timestamp (the time at which the media file was collected). Such metadata identifies an inspection being performed. A central server, e.g., server 720 can be configured to examine incoming media files and/or their associated document files sent to it from various inspection apparatuses 100, 101, 110, 111, and populate metadata from examined files into a database 820, which may be provided by a multi-table relational database.

Figure 8:
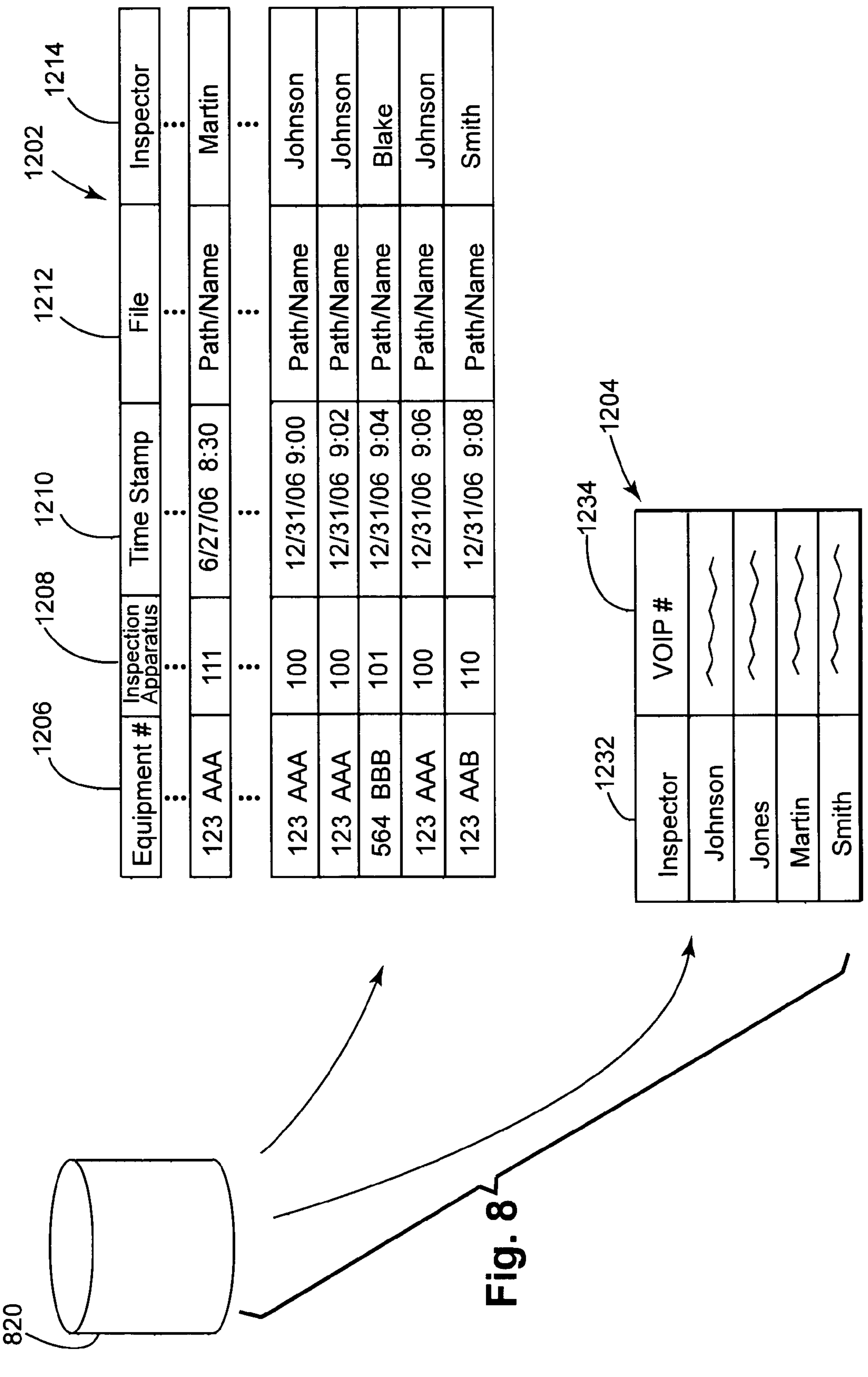
FIG. 8 is a diagram illustrating an exemplary database structure.

In one example, a designated central server may retain a database 820 having a table 1202 and a table 1204 as shown in FIG. 8. Referring to table 1202, table 1202 can include equipment #, column 1206, inspection apparatus column 1208, timestamp column 1210, file column 1212, and inspector column 1214.

In one example, system 1000 can be configured so that when like equipment inspectors button 1114 is actuated, system 1000 examines database 820 including data collected by several apparatuses 100, 101, 110, 111 during past inspections to determine appropriate inspectors to contact when initiating a next IP based voice communication connection. System 1000 can be configured so that when button 1122 is actuated with like inspectors equipment button 1114 highlighted, apparatus 100 sends a command to server 720 to query database 820 to return a list of addresses to which a next initiated IP based voice communication connection can be addressed. Standard Query Language (SQL) commands may be utilized. In the example of FIG. 8, each equipment article of a set of equipment articles is given a unique equipment article where a three digit prefix of the equipment article indicates an equipment type. In one example, when configure button 1122 of apparatus 100 is actuated with like equipment inspectors button 1114 highlighted, system 1000 might be configured to return information corresponding to inspectors who are contemporaneously inspecting similar equipment articles. A contemporaneously inspecting inspector can be regarded an inspector who has collected a file for sending to database 820 within a predetermined time window (e.g., 10 min., 1 hour). System 1000, in such an embodiment, could return an address corresponding to inspector Smith who, as is indicated by table 1202, is contemporaneously inspecting with use of inspection apparatus 100, an equipment article 123AAB which is of a like type as the inspection article being inspected by inspector Johnson with use of inspection apparatus 100 (taking the example where database 820 is queried at 10:00 and a predetermined time window is 1 hour of the query). When a query of database 820 returns information corresponding to inspector Smith, apparatus 100 is set up so that when initiate button 1104 is actuated, an IP voice communication connection is initiated between apparatus 100 and inspector Smith. In returning information corresponding to inspector Smith, system 1000 may return more than one item of information. One item of information that system 1000 may return is the address of apparatus 110 that is currently being used by inspector Smith; that is, the address corresponding to apparatus 110. Another item of information that may be returned to inspector Smith is a personal mobile phone identifier of inspector Smith such as a VOIP phone number of inspector Smith corresponding to a mobile phone 400, 410, of inspector Smith. It is seen that database 820 can include more than one table. For example, table 1204 can include an inspector column 1232 and a VOIP phone number. System 1000 can be configured so that once querying of table 1202 returns an inspector, table 1204 can be queried to return a VOIP phone number of a personal mobile phone such as mobile phone 400, 410 of inspector Smith. In addition to returning information corresponding to inspectors contemporaneously inspecting a like type but different equipment article when like equipment inspectors button is actuated, system 1000 can be configured to return information corresponding to inspectors who have previously inspected the identical equipment article irrespective of any time window. When like equipment inspectors button 1114 has been actuated, system 1000 may return a VOIP phone number (VOIP #) for inspector Martin who has previously inspected the equipment article identified by 123AAA. In returning VOIP # for inspector Martin, system 1000 may query table 1202 in order to return the identity of the inspector, and then query table 1204 keying using the identified inspector to return an appropriate VOIP # from table 1234.

System 1000 in one embodiment can be configured so that when button 1114 is actuated, window 1162 (FIG. 7) is displayed allowing an inspector to select whether a time window for filtering like inspector identifiers will be active and if so, the period for such time window. In the example provided, button 1164 can be actuated to designate a 10 minute time window, button 1166 for 1 hour time window and button 1168 for no time window. System 1000 can be configured so that time window selection window 1172 can be displayed when contemporaneous receivers button 1112 is actuated prompting an inspector to define a criteria for qualifying as a contemporaneous receiver. If button 1174 is highlighted a 10 minute time window is applied in determining whether a receiving computer is a contemporaneous receiver, if button 1176 is highlighted, an hour time window is applied. If button 1178 is highlighted, computers currently receiving data from the inspection apparatus being subject to setup qualify as contemporaneous receivers. If button 1180 is highlighted, computers receiving data of a current incomplete inspection procedure qualify as contemporaneous receivers.

It is seen that a query of database 820 can return an address of both an apparatus 101, 110, 111 and a mobile telephone 400, 410, configuring apparatus 100 so that when initiate button 1114 is actuated, apparatus 100 can concurrently initiate an IP based voice communication connection to both of a wireline connected inspection apparatus 101, 110, 111 and a cellular network connected mobile telephone 400, 410.

Still referring to FIG. 7, apparatus 100 can include groups button 1116. Apparatus 100 can be configured so that when groups button 1116 is actuated, window 1151 appears enabling an inspector to designate one or more owners, experts (supervisors), or inspectors (peers) to whom a next IP based voice communication connection is to be made. In one example, database 820 can include several tables mapping names of owners, experts (supervisors) and peers (inspectors) to VOIP #S. When a certain name has been designated using apparatus 100, apparatus 100 can query database 820 for the VOIP phone #. Apparatus 100 can then query a VOIP # server (not shown) to return a current IP address corresponding to the VOIP # in order to determine an address for addressing an IP based voice communication connection. After a query of VOIP sever returns a current IP address, actuation of initiate button 1104 can initiate an IP based voice communication with a computer in the form of a mobile phone, e.g., computer 400 where computer 400 is the mobile phone of the selected owner, expert, or peer of system 1000.

Further regarding the user interface of FIG. 7, the inventors observed that an intended human recipient of an IP based voice communication connection initiated by apparatus 100 may not be present at a computer of system 1000 associated with the intended recipient at a time when a voice communication connection is initiated. Accordingly, system 1000 can be configured so that each workstation computer 600, 601, 610, 611 and each inspection apparatus 100, 101, 110, 111 is configured to automatically record an audio file (e.g., a WAV file) for later listening by an intended human recipient corresponding to each IP voice communication connection initiated between an inspection apparatus 100, 101, 110, 111 and a workstation computer 600, 601, 610, 611.

In another aspect, system 1000 can be configured to automatically signal an alarm condition in response to examining of file data and/or associated metadata of a file collected by an inspection apparatus (e.g., apparatus 100). As part of signaling an alarm condition, system 1000 may responsively (automatically) initiate an IP based voice communication connection between the inspection apparatus collecting the examined data and one or more specific supervisory workstation computers determined to be contemporaneously receiving data collected by apparatus 100. As part of signaling an alarm condition, system 1000 may also cause textual messages to be displayed on a collecting inspection apparatus and/or a supervisory workstation indicating the nature of the location (e.g., apparatus indicator) of the event giving rise to an alarm condition.

In one embodiment, as has been described, system 1000 can be configured so that each inspection apparatus 100, 101, 110, 111 sends data such as file data and associated metadata to a central server, e.g., server 720, which can process the received data in the population of an organized database 820, which can be e.g., a relational database or an object oriented database. In a further aspect, system 1000 (and in one embodiment server 720 specifically) can be configured to examine file data and/or associated metadata in order to check for the presence of a condition giving rise to an alarm condition. Responsively to the examination of file data and/or metadata, system 1000 (specifically server 720 in one embodiment) can signal an alarm condition. Metadata associated with file data, as has been mentioned, can include equipment #, inspector, job #, apparatus identifier. Metadata can also include data generated by a sensor, e.g., location data as generated by a GPS device or temperature data. In one example, image signals generated by image sensor 132 can be processed to determine a temperature in head assembly 114. For example, a presence of noise of certain characteristics may be interpreted to be an indicator of a certain temperature in head assembly 114. A temperature of head assembly 114, as determined by processing of image signals generated by image sensor 132, can be associated with collected files as metadata. Alternatively, temperature thermistor 125 can be disposed in head assembly 114, and can generate an output signal indicative of temperature which can be input into DSP 152.

In examining for the presence of an alarm condition, system 1000 (and in one embodiment server 720) can examine file data and/or metadata. For example, in examining file data, server 720 can subject a collected image file or frame of a video file to pattern recognition processing and an alarm condition may be signaled on the detection of a certain object, e.g., a recognized crack in an equipment article. In another example, server 720 may examine incoming metadata. For example, server 720 may examine head assembly temperature data associated with each file and can determine that an alarm condition is present if a head assembly temperature associated with a certain file is above a predetermined temperature.

When server 720 in the described embodiment determines that an alarm condition is present, system 1000 can cause inspection apparatus 100 and supervisory computers, (e.g., which may be workstation computers 620 and 611 in one example) contemporaneously receiving data from apparatus 100 to display textual messages on displays thereof indicating the nature and possibly the location of the condition giving rise to the alarm condition. For example, inspection apparatus 100 may be caused to display the messaged CRACK DETECTED or HEAD TOO HOT. Supervisory computers 620, 611 may be caused to display the textual messages CRACK DETECTED BY APPARATUS 100 or HEAD OF APPARATUS 100 TOO HOT.

Various methods can be employed for determining the identity of the one or more workstation computers contemporaneously receiving data from inspection apparatus 100. Workstation computers that have contemporaneously received data from inspection apparatus 100 can include (1) workstation computers which are currently receiving data from an inspection apparatus 100, (2) workstation computers which have received data from an inspection apparatus 100 within a time window, which time window can be user selectable and (3) workstation computers receiving data corresponding to a current inspection having a predetermined number of requirements, at least one of which has not yet been satisfied. For determination of the present set of supervisory workstation computers, server 720 may maintain a log file summarizing data requests by workstation computers 600, 601, 610, 611, 620, 621, receiving data collected from specific ones of apparatuses 100, 101, 110, 111 and sent to server 720.

The identity of the inspection apparatus 100, 101, 110, 111 that has collected data (e.g., a media file such as an image file or video file such as an audio visual file) and has sent the collected data to server 720 can be determined simply by examining data packets received (e.g., by server 720) from the inspection apparatus, which will include at least one address of the inspection apparatus. There is therefore described herein, an inspection system for inspecting industrial equipment articles, the inspection system comprising: a visual inspection apparatus having an elongated inspection apparatus and a two dimensional image sensor, said visual inspection apparatus having software and hardware enabling IP based voice communications with a computer in IP network communication with said visual inspection apparatus, a workstation computer having a user interface in communication with said visual inspection apparatus, the system having at least one computer receiving a media file collected by said visual inspection apparatus and metadata associated with said media file, the system being configured to process at least one of said media file and said associated metadata received from said visual inspection apparatus, the system being configured to read an address of a data packet comprising data of said media file and further being configured to initiate an IP based voice communication connection between said workstation computer and said visual inspection apparatus responsively to said processing of at least one of said media file and said associated metadata utilizing said address read from said data packet.

When an alarm condition is signaled, system 1000, in addition to causing display of textual messages at the appropriate inspection apparatus 100, 101, 110, 111 and the appropriate workstation computers contemporaneously receiving data from the inspection apparatus can establish an IP based voice communication connection between inspection apparatus 100 and one or more workstation computers determined to be the workstation computers contemporaneously receiving data from inspection apparatus 100. In establishing such a connection, system 1000 can cause such an IP based voice communication connection to be initiated by one or more workstation computers or by an inspection apparatus. In one example, system 1000 can be configured so that server 720 can examine data (e.g., metadata and/or associated file data) collected by an apparatus and responsively to an alarm condition being determined (detected) can establish an IP based voice communication by sending a communication including a command to an appropriate workstation computer commanding the workstation computer to initiate an IP based voice communication connection with an appropriate inspection apparatus. Also, system 1000 can be configured so that server 720 can examine data collected by an apparatus and responsively to an alarm condition server 720 can establish an IP based voice communication connection by sending a command to an appropriate inspection apparatus commanding the inspection apparatus to initiate an IP based voice communication connection with one or more appropriate workstation computers. After an IP based voice communication connection has been initiated, an expert (supervisor) working at a workstation computer can provide voice instructions regarding the alarm condition. Also, an inspector at the inspection apparatus can orally ask questions of a supervisor operating a workstation computer, or and/or can provide detailed information to the expert (supervisor) regarding the problem giving rise to the alarm condition.

In another aspect of system 1000, system 1000 can be configured so that each apparatus 100, 101, 110, 111 can automatically record in a suitable audio file format e.g., WAV file, recording of each IP based voice communication executed by the given inspection apparatus in the performance of an inspection. By recording of IP based voice communications, additional, more robust information is provided as part of the inspection data. For example, if a problem is noted regarding an equipment article during an inspection a recorded oral conversation regarding the problem between an inspector and an expert (supervisor) can be provided as part of the inspection record. In one embodiment, audio files corresponding to IP based voice communication connection executed by inspection apparatus 100 during the course of performing an inspection are saved in such manner as to allow the audio files to be easily reviewed as part of a review of data respecting an inspection.

For example, in one embodiment of system 1000, media files (e.g., image files and video files including multimedia files) that are collected during an inspection procedure and audio files (e.g., WAV files) recording IP based voice communication connections (voice communication connection audio files) are associated with common metadata. By associating visual media files and voice communication connection audio files with common metadata, the media files and voice communication connection audio files can be commonly returned when searching a database (e.g., database 820) including the files under one of the common metadata types. In one example, both collected visual media files and recorded voice communication audio files are associated with equipment # metadata that identifies a current inspection. In one example, both collected visual media files and recorded voice communication audio files are associated with job # metadata that identifies a current inspection. In one example, both collected visual media files and recorded voice communication audio files are associated with an inspection procedure identifier (which may or may not be provided by an equipment identifier e.g., equipment #). In one example, both collected visual media files and voice communication audio files are associated with timestamp metadata that identifies a current inspection. In one example, both collected visual media files and recorded voice communication audio files are associated with each of the above types of metadata that identify a current inspection.

A small sample of the systems described herein is as follows:

A1. An inspection system for inspecting industrial equipment articles, the inspection system comprising:

a visual inspection apparatus having an elongated inspection tube and a two dimensional image sensor, said visual inspection apparatus having a voice coder/decoder for converting analog voice signals into digital form and for converting digital voice signals into analog form, the visual inspection apparatus further having an acoustic input device generating analog voice signals coupled to said coder/decoder and an acoustic output device receiving analog voice signals coupled to said coder/decoder, said visual inspection apparatus being configured to enable an IP based voice communication between said visual inspection apparatus and computer in IP network communication with said visual inspection apparatus;

wherein said visual inspection apparatus is configured to include a user interface enabling said visual inspection apparatus to initiate, responsively to an action by an inspector, an IP based voice communication connection between said visual inspection apparatus and a computer of said system external to said visual inspection apparatus.

A2. The inspection system of A1, wherein said system is configured to enable an inspector to designate information enabling said visual inspection apparatus to initiate said IP based voice communication connection with a specific computer of said system.

A3. The inspection system of A1, wherein said visual inspection apparatus further has hardware and software enabling recording of an audio file corresponding to an IP based voice communication connection between said visual inspection apparatus and a computer in IP communication with said visual inspection apparatus.

A4. The inspection system of A1,wherein said system is configured so that an external computer of said system communicates to said visual inspection apparatus information enabling said visual inspection apparatus to initiate said IP based voice communication connection to a specific one or more computers of said system.

A5. The inspection system of A1, wherein said system is configured so that said inspector can set up said visual inspection apparatus so that an IP based voice communication connection initiated by said visual inspection apparatus is made to an external computer currently receiving streaming data being collected by said visual inspection apparatus.

A6. The inspection system of A1, wherein said system is configured so that an external computer of said system communicates to said inspection apparatus information enabling said visual inspection apparatus to initiate said IP based voice communication connection to a specific one or more computers of said system that are determined by said system to be computers contemporaneously receiving data from said inspection apparatus.

A7. The inspection system of A6, wherein said one or more computers contemporaneously receiving data from said inspection apparatus are computers to which said inspection apparatus is addressing data packets to or has addressed data packets to within a predetermined time window or in a present inspection procedure.

A8. The inspection system of A6, wherein said specific one or more computers contemporaneously receiving data from said inspection apparatus are computers to which said inspection apparatus is not and has not addressed data packets to in a present inspection procedure or within a predetermined time window.

A9. The inspection system of A1, wherein said system is configured so that said system can initiate IP based voice communication connections with more than one computer of said system concurrently.

A10. The inspection system of A1, wherein said visual inspection system is configured so that a said visual inspection apparatus can concurrently initiate an IP based communication between said apparatus and a first computer in wireless communication with said apparatus and a second computer in cellular network wireless communication with said visual inspection apparatus.

A11. The inspection system of A1, wherein a computer of said system is configured to record an audio file corresponding an IP based voice communication initiated by said inspection apparatus.

A12. The inspection system of A1, including a database retained in one or more computers external to said visual inspection apparatus, the system including at least one peer inspection apparatus, the database including data collected by said visual inspection apparatus and said peer inspection apparatus during previous inspection procedures, the system being configured so that said visual inspection apparatus, when initiating said IP based voice communication connection addresses a computer having an address determined responsively to a query of said database.

A13. The inspection system of A1, wherein said user interface is a graphical user interface enabling an inspector to designate one of owners, experts, and peer inspectors for addressing of an IP based voice communication connection to be initiated by said visual inspection apparatus.

A14. The inspection system of A1, wherein said system includes a mobile telephone of an enterprise personnel selected from the group consisting of at least an owner, expert, or peer, and wherein said user interface is configured to enable an inspector to designate said enterprise personnel as a recipient of an IP based voice communication to be initiated by said inspection apparatus, wherein said inspection apparatus is configured so that said inspection apparatus can initiate an IP based voice communication connection with said mobile telephone responsively to said designation of said enterprise personnel.

A15. The inspection system of A1, wherein said user interface enables an inspector to designate contemporaneously receiving computers for receiving an IP based communication connection to be initiated by said inspection apparatus, the contemporaneously receiving computers being computers that have contemporaneously received data collected by said visual inspection apparatus.

A16. The inspection system of A1, wherein said user interface enables an inspector to designate that said IP based voice communication connection that is to be initiated by said inspection apparatus, is to be addressed to one or more computers of inspectors inspecting a like equipment article, like the equipment article being inspected using said visual inspection apparatus.

B1. An inspection system for inspecting industrial equipment articles, the inspection system comprising:

a visual inspection apparatus having an elongated inspection apparatus and a two dimensional image sensor, said visual inspection apparatus having software and hardware enabling IP based voice communication with a computer in IP network communication with said visual inspection apparatus; and a workstation computer having a user interface in communication with said visual inspection apparatus, the system having at least one external computer receiving a media file collected by said visual inspection apparatus and metadata associated with said media file, the system being configured to process at least one of said media file and said associated metadata received from said visual inspection apparatus, the system being configured to read an address of a data packet comprising data of said media file and further being configured to establish an IP based voice communication connection between said workstation computer and said visual inspection apparatus responsively to said processing of at least one of said media file and said associated metadata utilizing said address read from said data packet.

B2. The inspection system of B1, wherein said workstation computer is disposed in a common local facility with said visual inspection apparatus.

B3. The inspection system of B1, wherein said workstation computer is a remote host computer not disposed in a common local facility with said visual inspection apparatus.

B4. The inspection system of B1, wherein said workstation computer processes said media file.

B5. The inspection system of B1, wherein said processing of said at least one of said media file and associated metadata includes processing of said media file.

B6. The inspection system of B1, wherein said processing of said at least one of said media file and associated metadata includes processing of said metadata.

B7. The inspection system of B1, wherein said processing of said at least one of said media file and associated metadata includes processing of said metadata and said media file.

B8. The inspection system of B1, wherein said system includes a server external to said workstation computer processing said media file.

B9. The inspection system of B1, wherein said metadata includes temperature data.

C1. An inspection system for inspecting industrial equipment articles, the inspection apparatus comprising:

a visual inspection apparatus having an elongated inspection tube and a two dimensional image sensor, said visual inspection apparatus having software and hardware enabling IP based voice communication with a computer in IP network communication with said visual inspection apparatus, the visual inspection apparatus further having hardware and software enabling recording of an audio file corresponding to an IP based voice communication connection between said visual inspection apparatus;

wherein said inspection apparatus is configured to collect certain data in response to control signals initiated responsively to action by an inspector during the course of an inspection of said equipment article, the certain data including at least one media file corresponding to said equipment article, wherein said inspection apparatus is further configured so that said inspection apparatus associates certain metadata to said at least one media file collected by said apparatus;

wherein said inspection apparatus is configured to record an audio file corresponding to an IP based voice communication connection of said apparatus during performance of said inspection; and wherein said inspection apparatus is further configured so that said inspection apparatus associates said certain metadata to said audio file collected by said inspection apparatus.

C2. The system of C1 wherein said certain metadata is an equipment number.

C3. The system of C1 wherein said certain metadata is a job identifier.

C4. The system of C1 wherein said certain metadata is an inspection procedure identifier.

D1. An inspection system comprising:

a plurality of inspection apparatuses each having an elongated inspection module and a two dimensional image sensor generating image signals, a central server in communication with each of said plurality of inspection apparatuses;

a plurality of workstation computers in communication with said central server;

wherein the central server is configured to receive data collected from a certain one of said inspection apparatuses, the central server reading an address of said certain inspection apparatus when receiving said data collected from said certain one of said inspection apparatuses;

wherein said central server is configured to receive a data request for said data collected from said certain one of said inspection apparatuses from a certain one of said workstation computers, the central server reading an address of said certain one of said workstation computers when receiving said data request; and wherein said system is configured to utilize said address of said certain inspection apparatus and said certain workstation computer in establishing an IP based voice communication connection between said certain inspection apparatus and said certain workstation computer.

D2. The inspection system of D1, wherein said system discriminates whether said a workstation computer is a contemporaneously receiving workstation computer.

D3. The inspection system of D1, wherein said central server is configured to examine said received data collected from said certain one of said inspection apparatuses for determining whether an alarm condition is present.

D4. The inspection system of D1, wherein said certain one of said inspection apparatuses has a user interface enabling an inspector to cause said certain inspection apparatus to initiate an IP based voice communication with a workstation-computer contemporaneously receiving data from said certain inspection apparatus.

D5. The inspection system of D1, wherein said central server is configured to send said certain inspection apparatus said address of said certain workstation computer receiving data collected by said certain inspection apparatus and received by said central server for use by said certain inspection apparatus in initiating an IP based voice communication connection to said certain workstation computer.

D6. The inspection system of D1, wherein said central server is configured to send a command to said certain workstation computer which command when executed by said certain workstation computer results in said certain workstation computer initiating an IP based voice communication connection to said certain inspection apparatus.

D7. The inspection system of D6, wherein said system is configured so that said central server can send said command to said workstation computer responsively to an examination of said data collected by said certain inspection apparatus and received by said central server.

D8. The inspection system of D1, wherein said central server is configured to send a command to said certain inspection apparatus which command when executed by said certain inspection apparatus results in said certain inspection apparatus initiating an IP based voice communication connection to said certain workstation computer.

D9. The inspection system of D7, wherein said system is configured so that said central server can send said command to said inspection apparatus responsively to an examination of said data collected by said certain inspection apparatus and received by said central server.

While apparatuses, methods and systems described herein as having a certain number of elements, it will be understood that the described apparatuses, methods, and systems can be provided in forms having fewer than the described number of elements. The term "adapted" herein has the same meaning as the term "configured".

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. An inspection system for inspecting industrial equipment articles, the inspection system comprising:

a workstation computer for connecting to an Internet Protocol (IP) network;

a visual inspection apparatus for connecting to the IP network, the visual inspection apparatus comprising:

an elongated inspection tube;

a two dimensional image sensor disposed at a distal end of the elongated inspection tube;

a voice coder/decoder for converting analog voice signals into digital form and for converting digital voice signals into analog form;

an acoustic input device generating analog voice signals coupled to said voice coder/decoder;

an acoustic output device receiving analog voice signals coupled to said voice coder/decoder;

a processor for receiving inspection data from at least one of the voice coder/decoder and the two dimensional image sensor, and for transmitting the inspection data over the IP network; and a display for displaying a graphical user interface configuration window to a user of the visual inspection apparatus, the graphical user interface configuration window including a plurality of selections presented to the user for selectably setting up an IP based voice communication connection between said visual inspection apparatus and the workstation computer, wherein one of the selections comprises a user selectable time duration for initiating the IP based voice communication connection automatically with the workstation computer if the workstation computer has previously received the inspection data collected by the visual inspection apparatus within the user selectable time duration.

2. The inspection system of claim 1, wherein another one of the selections comprises a user selectable third party designation for initiating the IP based voice communication connection automatically with the workstation computer if the workstation computer has previously received the inspection data from a central repository within the user selectable time duration.

3. The inspection system of claim 2, wherein said visual inspection apparatus further comprises hardware and software enabling recording of an audio file comprising an oral conversation between the user of the visual inspection apparatus and a user of the workstation computer during said IP based voice communication connection between said visual inspection apparatus and said computer.

4. The inspection system of claim 1, wherein said inspection system is configured so that said workstation computer of said inspection system communicates to said visual inspection apparatus information enabling said visual inspection apparatus to initiate said IP based voice communication connection to said workstation computer of said inspection system.

5. The inspection system of claim 2, wherein said user selectable time duration is configured so that said IP based voice communication connection initiated by said visual inspection apparatus is made to said workstation computer while said workstation computer is currently receiving streaming inspection data transmitted by said visual inspection apparatus.

6. The inspection system of claim 1, wherein said inspection system is configured so that said workstation computer of said inspection system communicates to said visual inspection apparatus information enabling said visual inspection apparatus to initiate said IP based voice communication connection to said workstation computer of said inspection system that is determined by said inspection system to be contemporaneously receiving data from said visual inspection apparatus.

7. The inspection system of claim 6, wherein said workstation computer contemporaneously receiving data from said visual inspection apparatus is a device to which said visual inspection apparatus is addressing data packets to or has addressed data packets to within a predetermined time window or in a present inspection procedure.

8. The inspection system of claim 6, wherein said workstation computer contemporaneously receiving data from said visual inspection apparatus is a device to which said visual inspection apparatus is not and has not addressed data packets to in a present inspection procedure or within a predetermined time window.

9. The inspection system of claim 1, wherein said inspection system is configured so that said visual inspection apparatus can initiate IP based voice communication connections with multiple workstation computers of said inspection system concurrently.

10. The inspection system of claim 1, wherein said inspection system is configured so that said visual inspection apparatus can concurrently initiate said IP based voice communication connection between said visual inspection apparatus and a first computer in wireless communication with said visual inspection apparatus and a second computer in cellular network wireless communication with said visual inspection apparatus.

11. The inspection system of claim 1, wherein said workstation computer of said inspection system is configured to record an audio file corresponding to said IP based voice communication connection initiated by said visual inspection apparatus.

12. The inspection system of claim 1, including a database retained in one or more computers external to said visual inspection apparatus, the inspection system including at least one peer inspection apparatus, the database including data collected by said visual inspection apparatus and said peer inspection apparatus during previous inspection procedures, the inspection system being configured so that said visual inspection apparatus, when initiating said IP based voice communication connection addresses a computer having an address determined responsively to a query of said database.

13. The inspection system of claim 1, wherein said graphical user interface configuration window enables said user to designate one of owners, experts, and peer inspectors for addressing of said IP based voice communication connection to be initiated by said visual inspection apparatus.

14. The inspection system of claim 1, wherein said inspection system includes a mobile telephone of an enterprise personnel selected from the group consisting of at least an owner, expert, or peer, and wherein said graphical user interface configuration window is configured to enable said user to designate said enterprise personnel as a recipient of an IP based voice communication to be initiated by said visual inspection apparatus, wherein said visual inspection apparatus is configured so that said visual inspection apparatus can initiate said IP based voice communication connection with said mobile telephone responsively to said designation of said enterprise personnel.

15. An inspection system for inspecting an industrial equipment article, the inspection system comprising:

a workstation computer for connecting to an Internet Protocol (IP) network;

a visual inspection apparatus for connecting to the IP network, the visual inspection apparatus comprising:

an elongated inspection apparatus;

a two dimensional image sensor disposed at a distal end of the elongated inspection apparatus;

a graphical user interface display comprising a configuration window for displaying to a user of the visual inspection apparatus user selectable setup information for selectively controlling software and hardware enabling an IP based voice communication connection with the workstation computer based on the setup information; and a processor for receiving inspection data generated by the two dimensional image sensor during an inspection of the industrial equipment article, and for transmitting data packets comprising a media file over the IP network to the workstation computer, the media file comprising the inspection data and metadata associated with the media file, the metadata comprising an equipment number of the industrial equipment under inspection, a job number, an inspector, a timestamp, or a combination thereof; and said workstation computer for receiving the media file transmitted by said visual inspection apparatus, the workstation computer being configured to process said media file and to read an IP network address of the visual inspection apparatus from the data packets, and further being configured to automatically establish an IP based voice communication connection between said workstation computer and said visual inspection apparatus responsively to said processing of the media file and determining that an alarm condition exists at the industrial equipment article under inspection based on said processing of the media file.

16. The inspection system of claim 15, wherein said workstation computer is disposed in a common local facility with said visual inspection apparatus.

17. The inspection system of claim 15, wherein said workstation computer is a remote host computer not disposed in a common local facility with said visual inspection apparatus.

18. The inspection system of claim 15, wherein said inspection system includes a server external to said workstation computer processing said media file.

19. The inspection system of claim 15, wherein said metadata includes temperature data.

20. An inspection system for inspecting an industrial equipment article, the inspection system comprising:

a workstation computer for connecting to an Internet Protocol (IP) network;

a visual inspection apparatus for connecting to the IP network, the visual inspection apparatus comprising:

an elongated inspection tube;

a two dimensional image sensor disposed at a distal end of the elongated inspection tube;

a user interface display for displaying to a user of the visual inspection apparatus a configuration window for selectively controlling software and hardware enabling an IP based voice communication with the workstation computer, the visual inspection apparatus further comprising hardware and software enabling recording of an audio file of an oral conversation between the user of the visual inspection apparatus and a user of the workstation computer utilizing the IP based voice communication during an inspection of the industrial equipment article; and wherein said visual inspection apparatus is configured to collect inspection data generated by the two dimensional image sensor during the inspection of said industrial equipment article, the inspection data stored in a media file corresponding to said industrial equipment article, said visual inspection apparatus is further configured to generate certain metadata to identify the audio file and the media file as being associated with the inspection of the industrial equipment article, and to transmit the audio file, the media file, and the metadata to the workstation computer for storage therein, thereby enabling a common retrieval of the audio file and the media file in response to a search for the metadata.

21. The inspection system of claim 20 wherein said certain metadata is an equipment number.

22. The inspection system of claim 20 wherein said certain metadata is a job identifier.

23. The inspection system of claim 20 wherein said certain metadata is an inspection procedure identifier.

24. An inspection system comprising:

a plurality of inspection apparatuses each having an elongated inspection module and a two dimensional image sensor disposed at a distal end of the elongated inspection module, and each generating image signals corresponding to an inspection of a corresponding article, and each having storage for storing a media file containing the generated image signals and for storing metadata identifying the inspection of the corresponding article, the plurality of inspection apparatuses connected to an Internet Protocol (IP) network;

a central server connected to the IP network and in communication with each of said plurality of inspection apparatuses over the IP network;

a plurality of workstation computers each connected to the IP network and in communication with said central server over the IP network;

wherein the central server is configured to receive and store the media files from each of the plurality of inspection apparatuses, the central server further configured to read and store an IP network address of each of said plurality of inspection apparatuses that is included in a transmission of the received media files;

wherein said central server is further configured to receive a data request for one of said media files from a certain one of said workstation computers, the central server further configured to read an IP network address of said certain one of said workstation computers that is included in the received data request; and wherein said central server is configured to utilize said IP network address of an inspection apparatus corresponding to the requested one of the media files and the IP network address of said certain workstation computer to send a command over the network to either the inspection apparatus corresponding to the requested one of the media files or to the certain workstation computer, to establish an IP based voice communication connection between themselves.

25. The inspection system of claim 24, wherein said inspection system discriminates whether said workstation computer is a contemporaneously receiving workstation computer.

26. The inspection system of claim 24, wherein said central server is configured to examine said media files from said inspection apparatuses for determining whether an alarm condition is present at any of the inspected articles.

27. The inspection system of claim 24, wherein said inspection apparatuses each has a user interface enabling an inspector to cause a corresponding inspection apparatus to initiate said IP based voice communication with a workstation computer contemporaneously receiving data from said corresponding inspection apparatus.

28. The inspection system of claim 24, wherein said central server is configured to send to the inspection apparatus corresponding to the requested one of the media files said IP network address of said certain workstation computer for initiating said IP based voice communication connection to said certain workstation computer.

29. The inspection system of claim 24, wherein said central server is configured to send the command to said certain workstation computer which command, when executed by said certain workstation computer, results in said certain workstation computer initiating said IP based voice communication connection to said inspection apparatus corresponding to the requested one of the media files.

30. The inspection system of claim 29, wherein said inspection system is configured so that said central server can send said command to said workstation computer responsively to an examination of said requested one of the media files.

31. The inspection system of claim 24, wherein said central server is configured to send a command to said inspection apparatus corresponding to the requested one of the media files which command, when executed, results in said inspection apparatus corresponding to the requested one of the media files initiating said IP based voice communication connection to said certain workstation computer.

32. The inspection system of claim 31, wherein said inspection system is configured so that said central server can send said command to said inspection apparatus corresponding to the requested one of the media files responsively to an examination of said requested one of the media files.

* * * * *